United States Patent [19]
Filo

[11] Patent Number: 5,796,104
[45] Date of Patent: Aug. 18, 1998

[54] PYROELECTRIC CENTER OF MASS IMAGING

[75] Inventor: Andrew S. Filo, Cupertino, Calif.

[73] Assignee: Optum Corporation, Cupertino, Calif.

[21] Appl. No.: 812,052

[22] Filed: Mar. 7, 1997

Related U.S. Application Data

[60] Provisional application No. 60/012,979, Mar. 7, 1996.
[51] Int. Cl.$^6$ .................................................. G01T 5/10
[52] U.S. Cl. ................................. 250/330; 250/338.3
[58] Field of Search ........................... 250/338.3, 330

[56] References Cited

U.S. PATENT DOCUMENTS

| | | |
|---|---|---|
| 3,730,985 | 5/1973 | Whitney . |
| 3,742,136 | 6/1973 | Olsson . |
| 3,764,211 | 10/1973 | Morse et al. . |
| 3,798,366 | 3/1974 | Hunt et al. . |
| 4,027,159 | 5/1977 | Bishop . |
| 4,040,744 | 8/1977 | Schertz et al. . |
| 4,118,733 | 10/1978 | Sarson et al. . |
| 4,317,998 | 3/1982 | Dore . |
| 4,403,251 | 9/1983 | Domarenok et al. . |
| 4,672,439 | 6/1987 | Florence et al. . |
| 4,687,344 | 8/1987 | Lillquist . |
| 5,109,277 | 4/1992 | James . |
| 5,654,550 | 8/1997 | Nomura et al. ............ 250/338.3 |

FOREIGN PATENT DOCUMENTS

| | | | |
|---|---|---|---|
| 61-201121 (A) | 9/1986 | Japan | 250/338.3 |
| 2-311721 (A) | 12/1990 | Japan | 250/338.3 |
| 3-269390 (A) | 11/1991 | Japan | 250/338.3 |

*Primary Examiner*—Constantine Hannaher
*Attorney, Agent, or Firm*—Feix & Feix

[57] ABSTRACT

An apparatus and method for forming stabilized thermal images of thermally active objects in an objected scene using a pyroelectric detector and which does not require chopping or rapid panning. The invention includes focusing optics for focusing thermal radiation flux from a thermally active object under investigation onto a pyroelectric detector. The output signal generated by the pyroelectric detector is decoupled of its DC offset component. The output signal is then mixed with the results of the decoupled signal passing through a gain and level control. The result is that the invention acts to track and boost the decay in the pyroelectric image when the detector is staring at a static image. The resulting image is amplified to match the input requirements of a level detector that drives a selected thermal image display. In order to adequately display the thermal center of mass, the thermal image is combined with the visual image of the thermally active object under investigation. This is accomplished by overlaying the thermal image on the visual image using any number of conventional image combining techniques. Preferred image combining techniques include electro-optic combination (Relayed Image), optical combination (Virtual Image), or direct combination (Projected Image).

10 Claims, 8 Drawing Sheets

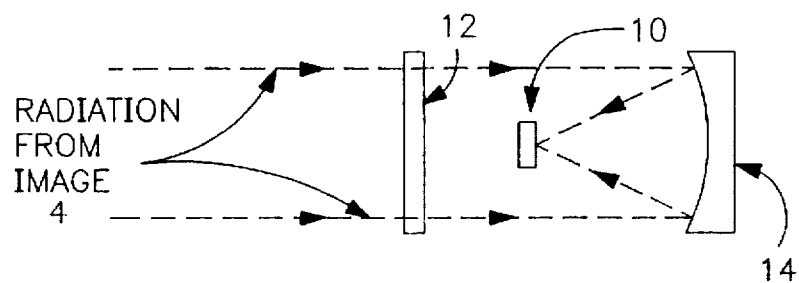
FIG. IA
(PRIOR ART)
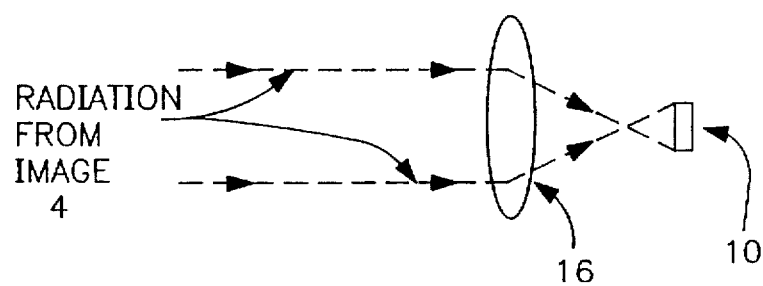
FIG. IB
(PRIOR ART)
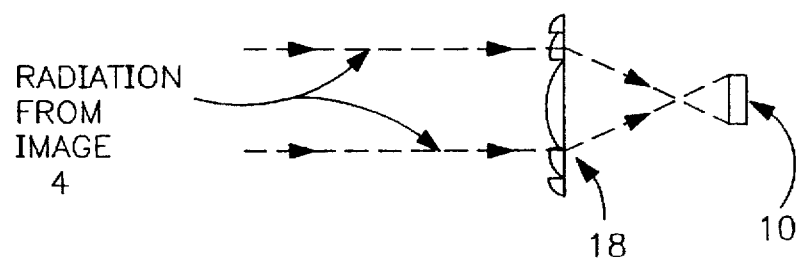
FIG. IC
(PRIOR ART)
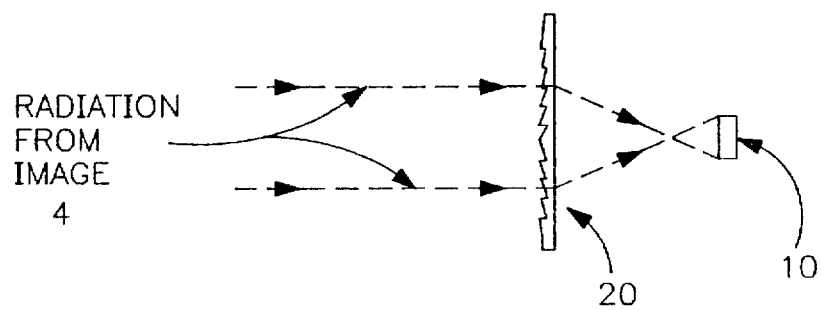
FIG. ID
(PRIOR ART)

PYROELECTRIC CENTER OF MASS IMAGING

RELATED U.S. APPLICATION

This application claims the benefit of U.S. Provisional Application No. 60/012.979, filed on Mar. 7, 1996.

FIELD OF THE INVENTION

This invention relates to thermal imaging, and more specifically to methods and apparatus for stabilizing, displaying and combining thermal images with visual images.

BACKGROUND

Thermal or Far Infrared (FIR) imaging has many uses in medical, industrial, and military applications. The benefits of combining thermal images with visible or low light images is tremendous since it shows thermal activity on or through an object. The simplest of the thermal imagers is pyroelectric.

Pyroelectric imaging and scanning has existed for a number of years. Pryoelectric devices are useful for detecting or identifying a thermal signature of an infrared source that has a temperature that is hotter that the ambient thermal environment. Pyroelectric devices use a crystal or polymer that has a molecular matrix that generates electrons when heated. Pyroelectric materials that respond to temperature changes in as little as 0.01 degrees F., from ambient are known from the prior art. Key to pyroelectric operation is the ability of the material to stabilize and sensitize itself without external cooling devices. The limitation of this action is that the pyroelectric device must have a continuously changing image value to produce an output signal. In the absence of some means for image compensation, a pyroelectric image will have a momentary DC offset and then rapidly fade to zero. This phenomena is illustrated pictorially in FIG. 2. In particular, FIG. 2 illustrates the decay in the intensity of the signal formed by a pyroelectric detector 2 and differential amplifier 3 when imaging an infrared object 4 in a staring mode using focussing optics 5.

Two techniques for producing a high rate of image change for a pyroelectric image are known in the prior art as "chopping" and "rapid panning". As the name implies, the chopping technique involves use of a chopper, typically in the form of a slotted motorized wheel or shutter. The chopper is used to interrupt the formation of the image on a cyclic basis to produce full contrast images. Chopping is an electro-mechanical solution that adds size and weight, while reducing overall reliability. Chopping requires that the chopper element be moving at a constant rate to allow precise image integration. Chopping also reduces sensitivity since it must block the radiation falling on the pyroelectric surface for a portion of the time.

In accordance with the rapid panning technique, the pyroelectric sensor is moved back and forth across the fields of view in order to be stimulated by the changing edges intensity of the image. Rapid panning is performed either electro-mechanically or by hand with the resulting image always on the move. Typically the rate must be at 2 sweeps per second. Variation in this rate produces uneven results.

Hand held thermal scanning devices which utilize the rapid scanning technique described above are known in the prior art. A problem encountered with such thermal scanning devices is that they only able to detect the leading and trailing edges of a thermal object under investigation. In many applications there could be multiple thermal objects in the field of view. For instance, if the field of view contained ten thermal bodies, the thermal scanning devices of the prior art would only indicate twenty edges during a scan or sweep of the field of view. The scanning device would not indicate which of the adjacent edge pairs connect. The capability of precisely indicating the center of a thermal body under investigation would be a significant advance in the art.

The present invention overcomes these and other problems in the prior art.

SUMMARY OF THE INVENTION

It is among the objects of the present invention to provide a method and apparatus for forming useable thermal image signals without the need for chopping or rapid panning.

It is another object of the present invention to provide a display that can synchronously and precisely indicate the center of thermal mass of a thermally active object or target under inspection to the operator, either directly or through a vision enhancing apparatus.

The method and apparatus of the present invention utilizes a conventional pyroelectric detector to form stabilized thermal images of thermally active objects without the need for chopping or rapid panning. Image compensation for the pyroelectric action is performed by a novel electronic device herein referred to as the "Center of Mass" (COM) device. The COM device allows for staring and very slow rate scanning. Key to its operation is the ability to track and compensate the decay of the pyroelectric image over a long period of time and to respond to large and small initial signals equally so as not to lose sensitivity or linearity. The COM device can be used for imaging systems as well as simple scanning systems.

One advantage afforded by the staring capability of the COM device is that imagers using the COM device can use conventional image combining techniques in order to indicate or display the center of thermal mass of a target in real time with proportional temperature changes.

The COM image formation method of the present invention can also be advantageously applied to both low and high resolution pyroelectric imaging arrays.

The COM device works by taking the signal of a pyroelectric detector and immediately decoupling the DC component from it. This signal is then mixed with the results of the decoupled signal passing through a gain and level control. The circuitry of the COM device acts to track and boost the decay in the pyroelectric image when the detector is staring at a static image. The resulting image is amplified to match the input requirements of a level detector that drives the selected display. In order to adequately display the thermal center of mass, the thermal image must be combined with the visual image of the thermally active object under investigation. This is accomplished by overlaying the thermal image on the visual image using any number of conventional image combining techniques. Preferred image combining techniques include electro-optic combination (Relayed Image), optical combination (Virtual Image), or direct combination (Projected Image). The resulting COM/display facilitates combination of thermal and visual images in a form factor that is very small, rugged and light weight.

More importantly, the COM device of the present invention is readily retro-fitted to any existing vision device that is visually directed or enhanced, thereby providing the retro-fitted vision device with an instant self-aligned thermal imaging capability. The type of vision devices to which the COM device of the present invention can be attached include, but are not limited to, film cameras, camcorders, surveillance cameras, remotely controlled vehicles, telescopes, binoculars, rifle scopes, spotting scopes, range finders, image intensifiers (starlight scopes), firearms and anti-tank rocket launchers.

The advantages of combining the thermal and visual spectrum lay in the fact that thermal gradients do not match visual properties. For example, smoke, foliage, and some plastics are almost completely transparent, while glass and water are opaque. Furthermore, surface temperatures such as thermal gradients in house walls caused by wall studs and heat ducts are readily visible, while the difference in visible colors and printed pigments do not exist in the thermal spectrum. By giving the operator both spectrums they can quickly evaluate the merits in a situation.

The COM device of the present invention is of beneficial utility in a number of applications including consumer applications (e.g. security cameras, hunting rifle scopes), emergency applications (e.g., search and rescue, fire fighting, finding hot spots or victims obscured by smoke or walls), industrial applications (e.g., checking heat dissipation and process monitoring), and military applications (e.g., detection of hidden combatants and vehicles, aiming and fire control systems).

Methods and apparatus which incorporate the features described above and which are effective to function as described above constitute specific objects of this invention.

Other and further objects of the present invention will be apparent from the following description and claims and are illustrated in the accompanying drawings, which by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

BRIEF DESCRIPTION OF DRAWINGS

FIG. 1A is a pictorial diagram illustrating a reflective optics systems for use in forming a thermal image suitable for a pyroelectric device.

FIGS. 1B–1D is a series of pictorial diagrams illustrating various focusing objective lens systems for use in forming a thermal image suitable for a pyroelectric device.

DETAILED DESCRIPTION OF THE PREFERRED EMBODIMENTS

Figure 2:
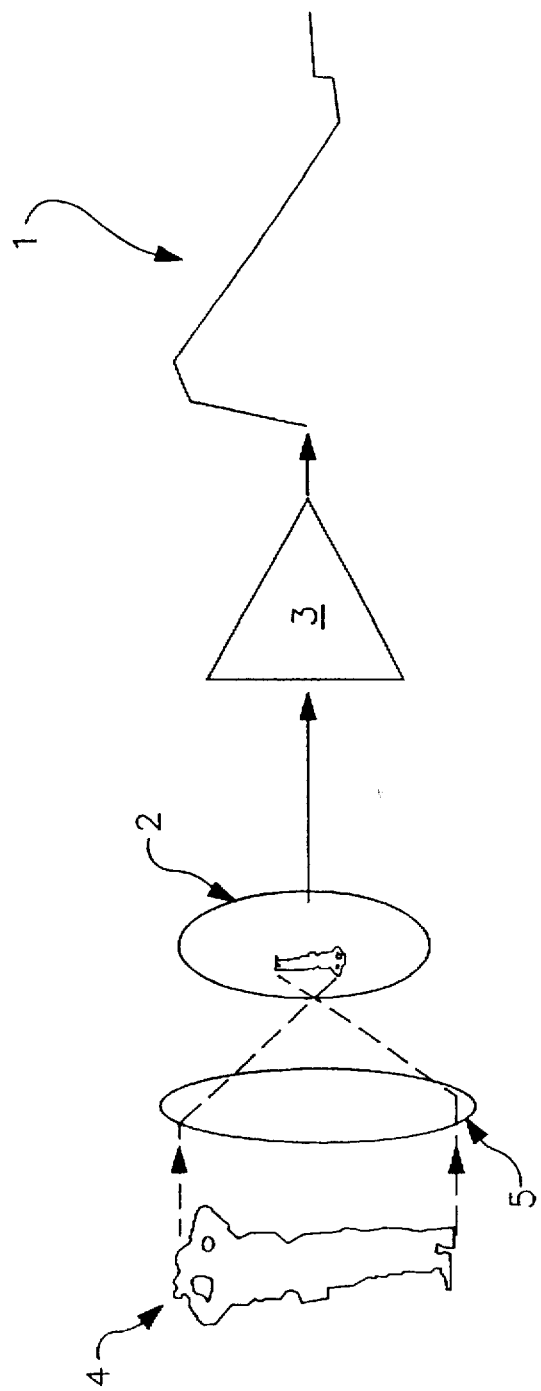
FIG. 2 is a pictorial diagram illustrating the pyroelectric device characteristic of decaying output signal intensity which occurs in staring imaging applications.

FIGS. 1A–1D show several optical systems suitable for use with a pyroelectric detector 10 for forming a thermal image of an object scene.

In FIG. 1A, there is shown a reflective optics arrangement consisting of a protective cover and concave mirror for guiding radiation from an image 4 to the detector 10.

Alternatively, as is seen in FIGS. 1B–1D, various known focusing objective lens systems may be used to focus radiation from an image onto the detector 10, including convex optics 16 (FIG. 1B), binary optic 18 (FIG. 1C), and Fresnel optic systems 20 (FIG. 1D).

The center of mass (COM) device of the present invention consists of circuitry and several specialized means to display the thermal image information.

Figure 3:
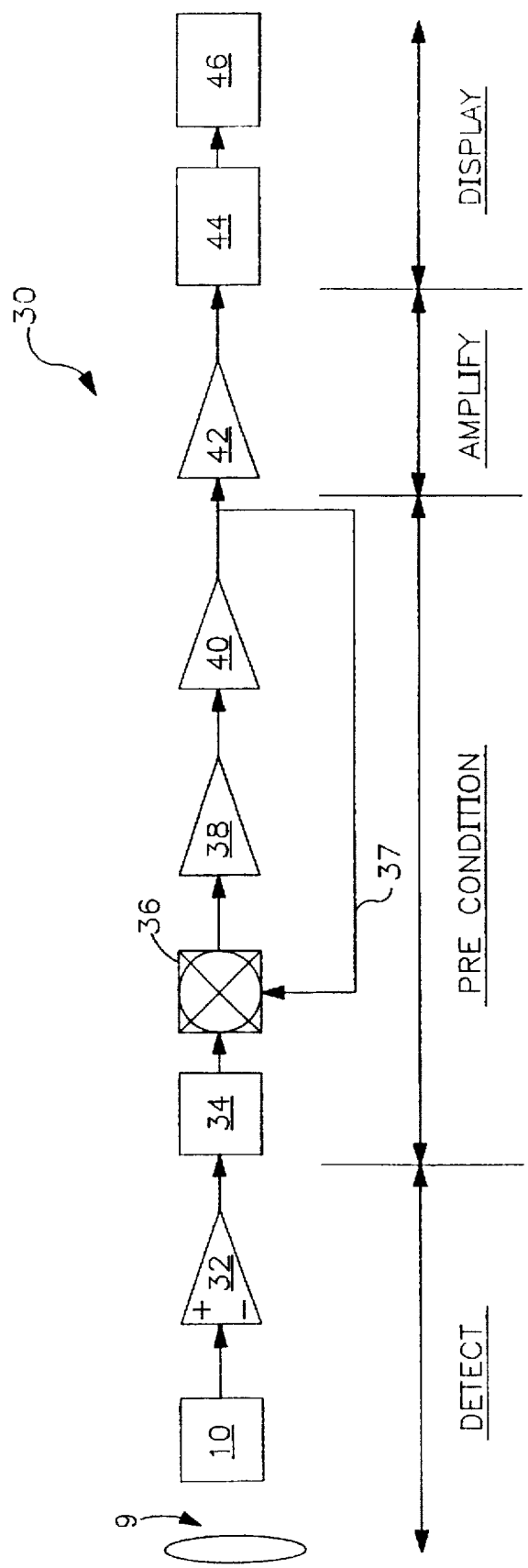
FIG. 3 is a block diagram illustrating the components of the center of mass (COM) device of the present invention.

With reference to FIG. 3, the circuitry of the COM device 30 comprises four main groups that are labeled in the figure as "Detect", "Precondition", "Amplify" and "Display". Thermal radiation from the thermal object under investigation is guided or focussed by the far IR optics 9 (e.g. any of the thermal image forming optical systems disclosed in FIGS. 1A–1D) onto the pyroelectric detector or sensor 10. In Detect, the signal generated at the pyroelectric detector 10 is amplified by a differential amplifier 32. In Precondition, the DC component of this signal is then decoupled at 34 and mixed at 36 with the feedback 37 from the signal generated when the decoupled signal sum passes through the gain control 38 and level control 40. In Amplify, the decoupled and mixed signal is then amplified by amplifier 42 in order to match the input requirements of the level detector 44 selected by driving the display 46 (in Display). The COM device 30 as described above operates to track and boost the decay in the pyroelectric image when the detector 10 is staring at a static image. The COM device 30 can operate in combination with single element, dual element, 1 dimensional arrays, 2 dimensional arrays and pyroelectric vidicons.

Figure 4:
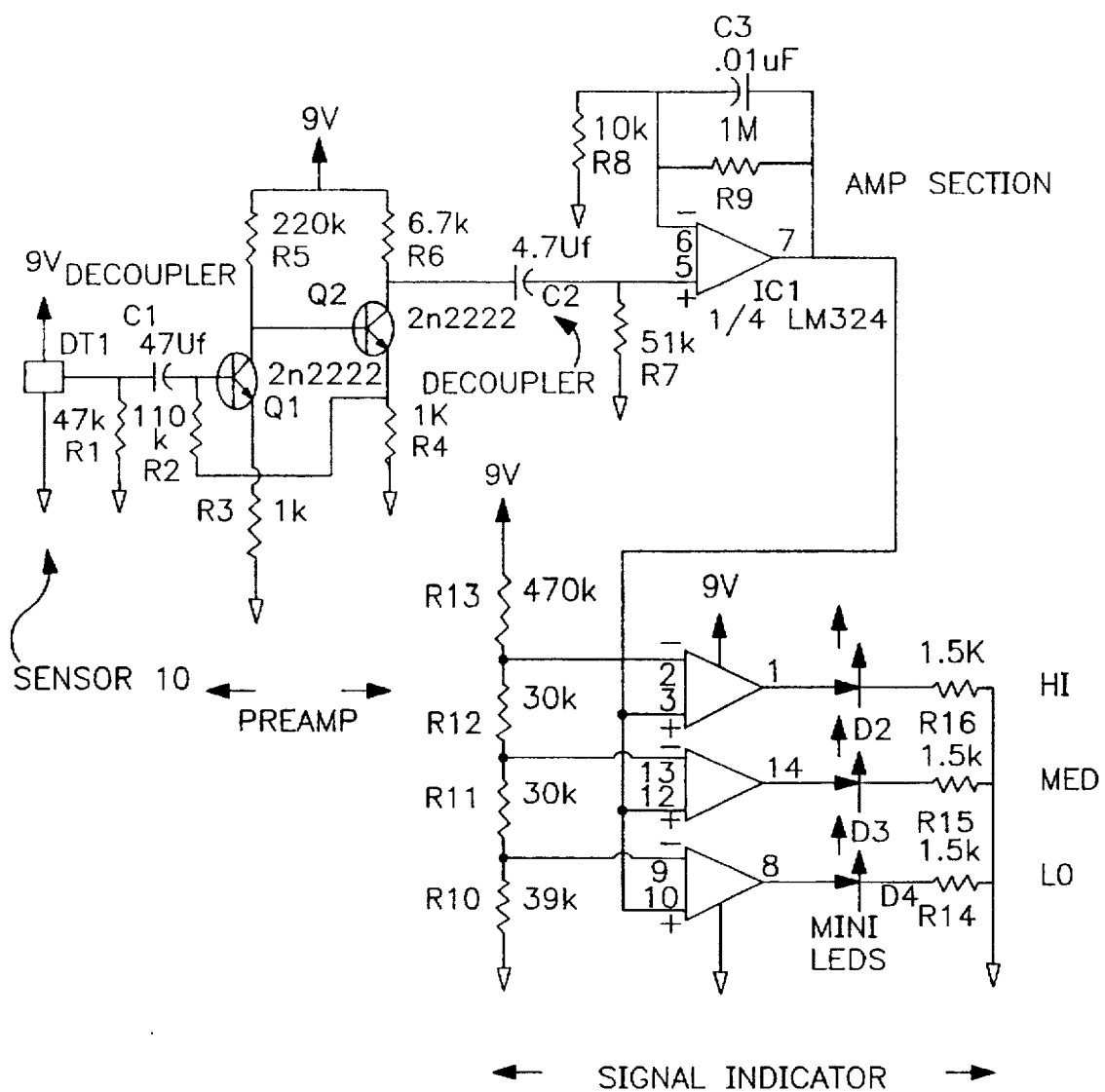
FIG. 4 is a schematic diagram illustrating a preferred embodiment of the COM circuit of the present invention.

With reference to FIG. 4, the operation of the COM circuit will now be described. In operation, the pyroelectric detector or sensor 10 is loaded with R1 to ground. The signal is decoupled by C1. R2 forms the feedback input with Q1 and Q2 providing automatic gain and level controls, respectively. Resistors R3–R6 provide the bias controls to Q1 and Q2. The signal is decoupled and amplified by ¼ of IC1. The boosted signal is processed by a ladder comparator circuit with LED display, resistors R10–R16, ¾ IC1, and D2–D4.

Figure 5A:
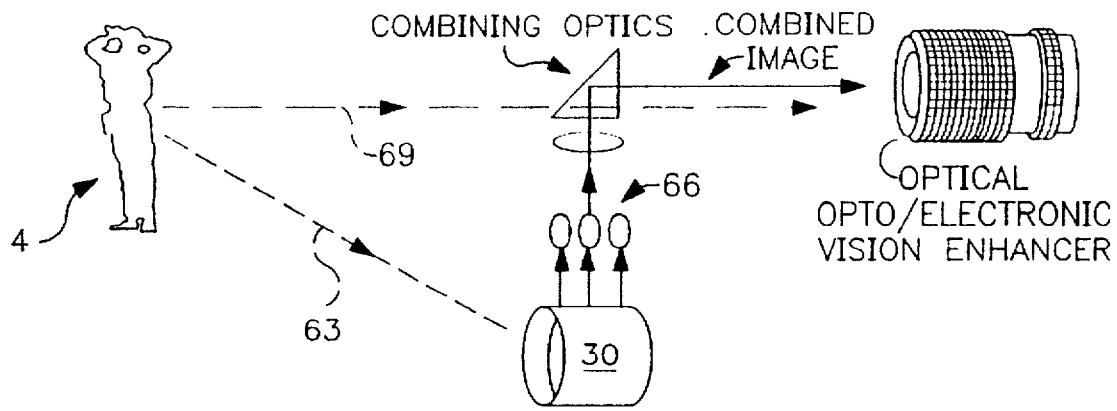
FIG. 5A is a block diagram of a relayed image display configuration for the COM device of the present invention.
Figure 5B:
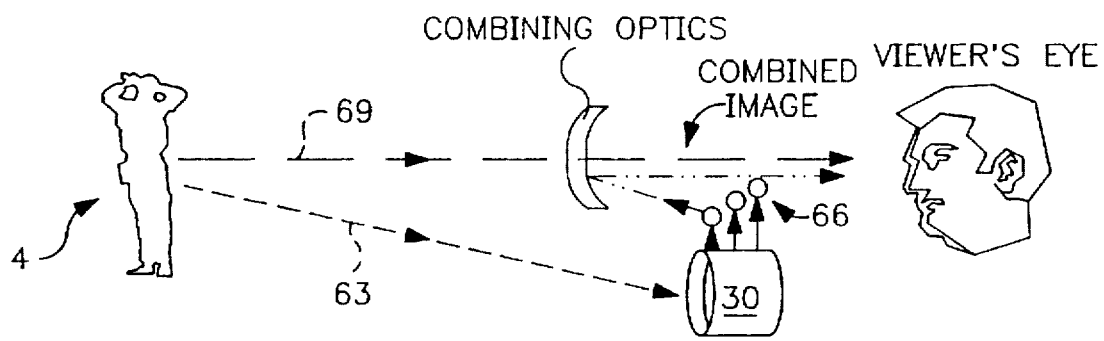
FIG. 5B is a block diagram illustrating a virtual image display configuration for the COM device of the present invention.
Figure 5C:
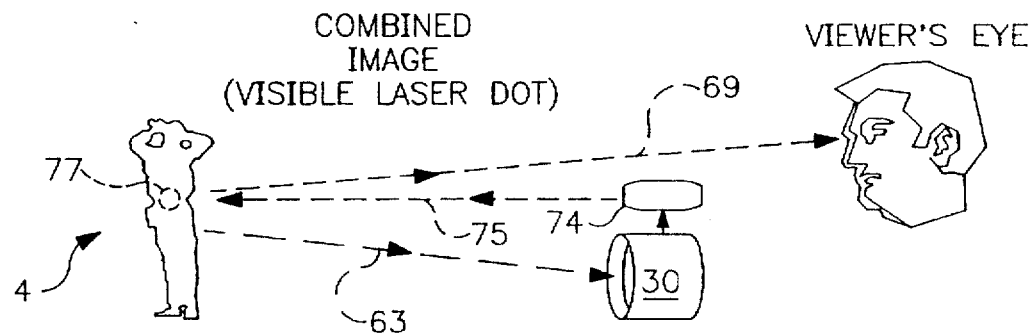
FIG. 5C is a block diagram illustrating a projected image display configuration for the COM device of the present invention.

In order to adequately display the thermal center of mass of a thermal object under investigation or thermal target, it is desirable to combine the thermal image of the thermal target with a visual image of the thermal target. FIGS. 5A–5C illustrate in pictorial fashion three exemplary optical interface configurations for combining visual and thermal images using the COM device of the present invention including a relayed image configuration (FIG. 5A), a virtual image configuration (FIG. 5B) and a projected image configuration (FIG. 5C). As is readily appreciated by those of ordinary skill in the art, the three visual display options noted above allow the COM device of the present invention to be adapted to a wide range of applications.

Figure 6:
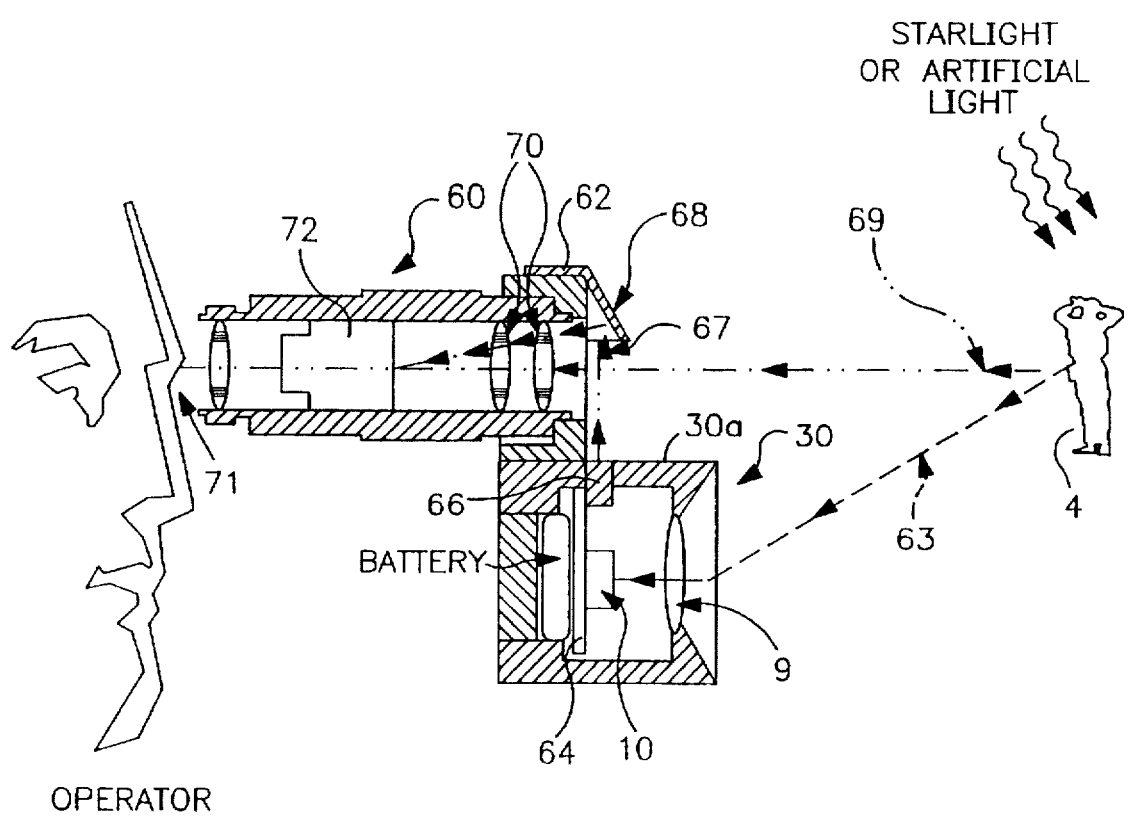
FIG. 6 is a cross section view of the COM device of the present invention attached as a retrofit to an image intensifier in accordance with a relayed image display application of the present invention.

With reference to FIGS. 5A and 6, the details of the relayed image interface configuration for the COM device will now be described. In the relayed image configuration shown, the COM device 30 is contained within a housing 30a that is attached to an image intensifier device 60 (e.g., starlight scope by a mounting collar 62). The far IR optics 9 of the COM device 30 focus the thermal radiation flux 63 from the target 4 onto the pyroelectric detector or sensor 10. The far IR optics 9 used preferably comprises one of the thermal image forming optical systems disclosed in FIGS. 1A–1D. The signal detected by the sensor 10 is processed by the electronics 64 (i.e., the COM circuit described in FIG. 4) where it is then displayed on the LED array 66. The image from the LED array 66 is then focused and projected by projector optics 68 onto the front optics (objective lens systems) 70 of the image intensifier 60. The projector optics 68 are contained within the mounting collar 62, and the mounting collar secures the COM device 30 to the front objective lens system 70 of the image intensifier 60. The projector optics 62 and the far IR optics 9 of the COM device 30 are assembled as pre-aligned. In this way, the projected image 67 relayed by the projector optics 68 will always correspond exactly to the pyroelectric sensing area regardless of how the COM device 30 is mounted to the image intensifier 60. This means that if the COM device 30 is shifted horizontally or vertically the projected image 67 and sensed area are matched and tracked. By clamping the COM device 30 to the barrel of the image intensifier 60 the projected image will be close to the center of the field of view of the image 67 intensifier 60. Regardless, the thermal projected image 67 will match the reflected light image 69 entering the objective lens system 70. The reflected light image 69 and the projected image are merged by the image intensifier tube 72 and displayed to the operator at 71.

Figure 7:
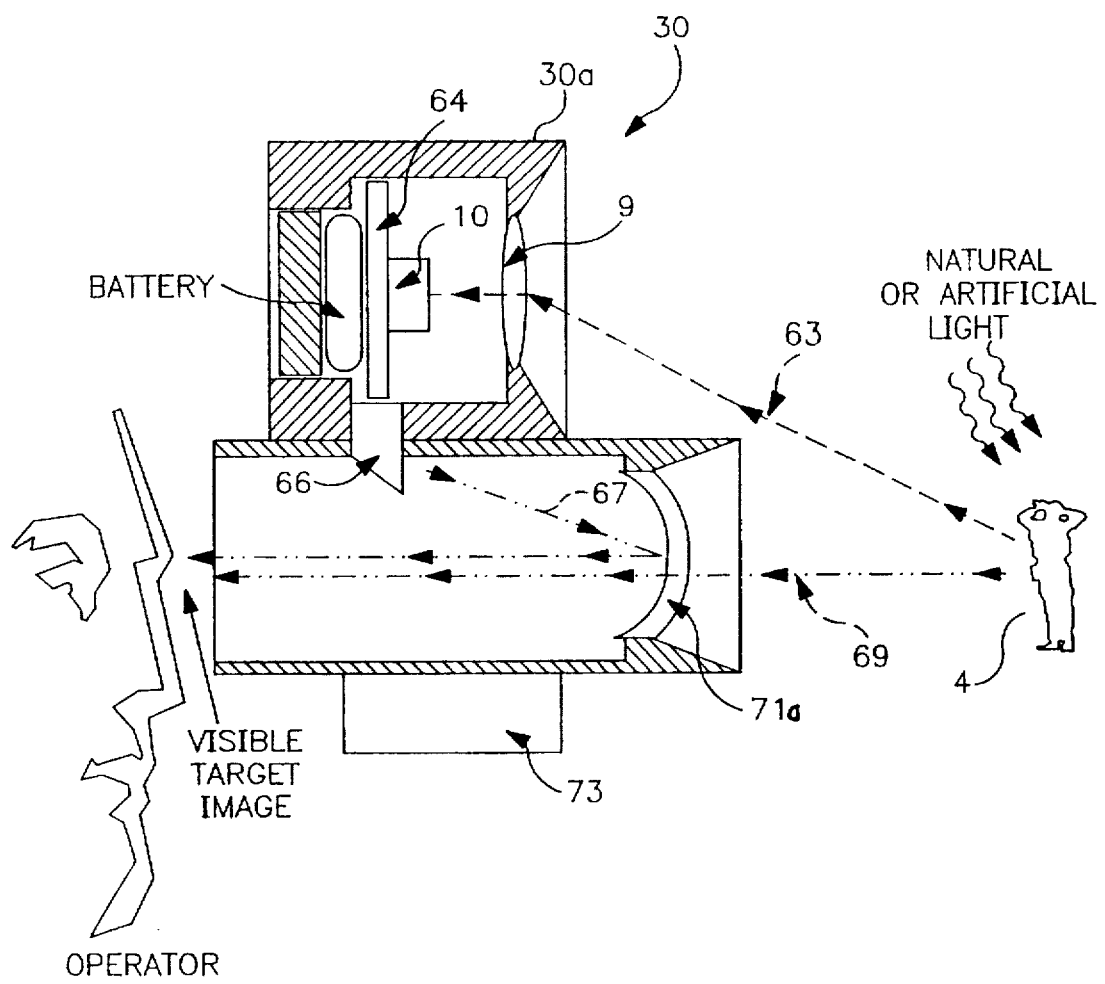
FIG. 7 is a cross section view showing the COM device of the present invention in combination with a virtual projected image display.

With reference to FIGS. 5B and 7, the details of the virtual image interface configuration for the COM device will now be described. In this configuration, the COM device 30 is substantially the same as described in the above embodiment except with a display change. In this display, projector optics 71a form a reflector that focuses the thermal image 67 of the display 66 to the user's eye. The projector optics 71a are angularly sensitive, requiring the viewer to sight the same angle as the Far IR Optics axis to see both the thermal and visual images 67 and 69. In this embodiment, the COM device 30 is shown as a retro-fit to a weapons or hand mount 73. This feature makes this unit ideal for weapon sighting applications. It is understood, of course, that the COM device 30 of the present invention may be adapted for retrofit mounting to apparatus used in a wide range of sighting applications where it is desirable to also obtain a heat signature of the sighted image. For example, the COM device 30 could be adapted for retrofit mounting to a helmet or a person's head. The COM device 30 could also be mounted on a remotely controlled vehicle or even a film camera.

Figure 8:
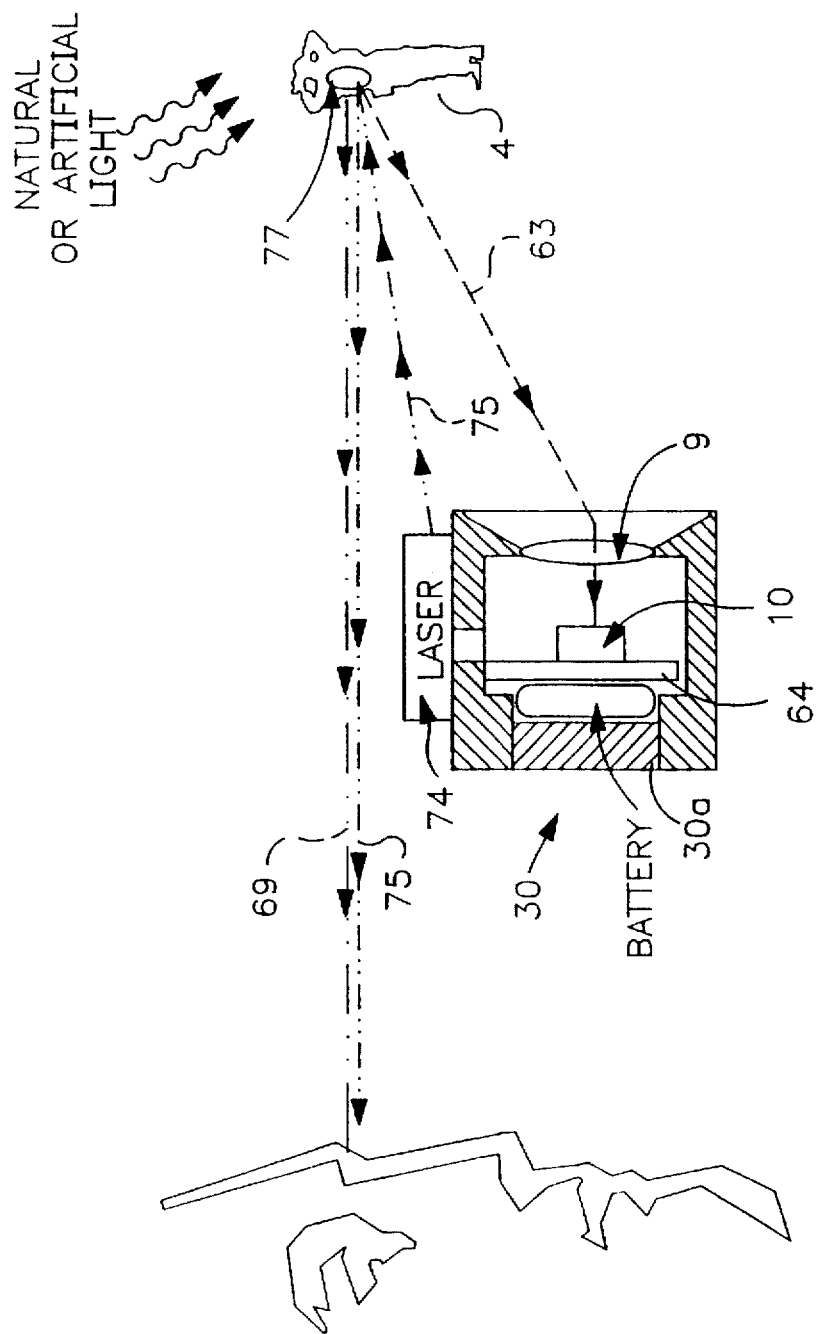
FIG. 8 is a cross section view showing the COM device of the present invention in combination with a laser module for projection of the thermal image directly upon the target.

The third display configuration is the projected image configuration shown in FIGS. 5C and 8. In this embodiment, a laser diode module 74 emits a focused image 75 of the thermal image and projects it upon the target 4. The laser 74 is aligned to the COM device 30, preferably by direct attachment, and its radiation has no effect on the thermal signature 63 of the target 4. The laser 74 is preferably set up to normally emit an aiming dot 77 so that upon detecting thermal radiation, a visual representation of the target's thermal signature is generated, thus showing the operator the nature of the target's heat distribution.

While I have illustrated and described the preferred embodiments of our invention, it is to be understood that these are capable of variation and modification, and I therefore do not wish to be limited to the precise details set forth, but desire to avail myself of such changes and alterations as fall within the purview of the following claims.

I claim:

1. A device for forming stabilized thermal images of thermally active objects without the need for chopping or rapid panning comprising:

a pyroelectric detector;

focusing means for focusing thermal radiation flux from a thermally active object under investigation onto said pyroelectric detector;

decoupling means responsive to said pyroelectric detector for decoupling a DC signal component from an output signal generated by said pyroelectric detector, said output signal representing the detected thermal radiation flux;

signal boosting means responsive to said decoupling means for boosting signal strength of said DC signal component;

mixing means for mixing said boosted DC signal component with said output signal of said pyroelectric detector; and display means responsive to said mixing means for displaying said mixed signal as a thermal image.

2. A device according to claim 1 which includes amplifier means responsive to said mixing means for amplifying said mixed signal to match an input requirement of a level detector of said display means.

3. A device according to claim 1 wherein said signal boosting means includes a gain control and a level control.

4. A device according to claim 1 wherein said focusing means comprises a reflective optics system including a concave mirror.

5. A device according to claim 1 wherein said focusing means comprises convex optical lens.

6. A device according to claim 1 wherein said focusing means comprises a binary lens.

7. A device according to claim 1 wherein said focusing means comprises a Fresnel lens.

8. A device according to claim 1 which includes attachment means for retro-fit attachment to a conventional visual imaging device, said attachment means including projector optics means for overlaying and aligning said thermal image displayed at said display means with a visual image of said thermal object taken by said visual imaging device.

9. A method for forming stabilized thermal images of thermally active objects without the need for chopping or rapid panning comprising:

focusing the thermal radiation flux from the thermally active object under investigation onto a pyroelectric detector;

generating as output from the pyroelectric detector a signal representing the detected thermal radiation flux;

decoupling a DC signal component from the output signal of the pyroelectric detector;

passing the DC signal component through a gain control and level control;

mixing via feedback the DC signal component that is passed through the gain control and level control with the DC signal component that is output from the pyroelectric detector;

amplifying the resulting mixed signal to match an input requirement of a level detector of a selected thermal image display; and displaying the amplified signal as a thermal image on the selected thermal image display.

10. The method according to claim 1, which includes:

taking a visual image of the object scene containing the thermal object under investigation;

aligning the thermal image with the visual image; and overlaying the thermal image on the visual image to indicate a thermal center of mass of the thermal object under investigation.

* * * * *